(12) United States Patent  
Bakke

(10) Patent No.: US 8,700,723 B2  
(45) Date of Patent: Apr. 15, 2014

(54) HIERARCHICAL DISPLAY-SERVER SYSTEM AND METHOD

(75) Inventor: Steve Bakke, Richardson, TX (US)

(73) Assignee: Netzyn, Inc.

( * ) Notice: Subject to any disclaimer, the term of this patent is extended or adjusted under 35 U.S.C. 154(b) by 101 days.

(21) Appl. No.: 13/160,122

(22) Filed: Jun. 14, 2011

(65) Prior Publication Data

US 2011/0307571 A1    Dec. 15, 2011

Related U.S. Application Data

(60) Provisional application No. 61/354,799, filed on Jun. 15, 2010.

(51) Int. Cl.
*G06F 15/16*    (2006.01)

(52) U.S. Cl.
USPC .......................................... 709/208; 709/203

(58) Field of Classification Search
USPC ................................................ 709/203, 208
See application file for complete search history.

(56) References Cited

U.S. PATENT DOCUMENTS

| | | | | |
|---|---|---|---|---|
| 6,249,294 B1* | 6/2001 | Lefebvre et al. | ............. | 345/504 |
| 6,345,291 B2* | 2/2002 | Murphy et al. | ............. | 709/208 |
| 6,348,933 B1* | 2/2002 | Walls et al. | ............. | 715/744 |
| 6,668,288 B1* | 12/2003 | Midwinter et al. | ............. | 710/29 |
| 8,171,517 B2* | 5/2012 | Hicks et al. | ............. | 725/62 |
| 8,196,169 B1* | 6/2012 | Herz | ............. | 725/48 |
| 8,204,855 B2* | 6/2012 | Salmon et al. | ............. | 707/610 |
| 8,205,035 B2* | 6/2012 | Reddy et al. | ............. | 711/103 |
| 8,296,357 B2* | 10/2012 | Stone et al. | ............. | 709/203 |
| 8,355,407 B2* | 1/2013 | Wookey et al. | ............. | 370/401 |
| 2003/0061323 A1 | 3/2003 | East et al. | | |
| 2003/0200178 A1* | 10/2003 | Rich et al. | ............. | 705/59 |

(Continued)

*Primary Examiner* — Melvin H Pollack  
(74) *Attorney, Agent, or Firm* — The Law Firm of H. Dale Langley, Jr., P.C.

(57) ABSTRACT

A computing system includes a hierarchical set of servers. The hierarchical set includes a master server and one or more slave server. The master server and slave servers communicate with at least one non-intelligent user system over a communications network. The master server has full access to each non-intelligent user system. The master server controls access permissions for each slave server to the non-intelligent user system(s). Each higher level slave server can control access permissions for sub-level slave server(s) to the non-intelligent user system(s). A master or, if permitted access, a slave server, creates a window in a display of the non-intelligent user system, and can provide access to the window to any lower-level slave server to send pixels to fill that window. The pixels can be the graphics output of an application such as a browser or spreadsheet or the pixels can be video (either live or read from a hard drive). In other applications of the servers, the server system can control output on components of the user system, and receive input from components and peripherals of the user system, all via communications over the network. Access to respective non-intelligent user systems is dictated by the master server and each higher level slave server of the hierarchical set of servers. Data representing input of components and peripherals is multiplexed and communicated over the network by the user system, and data representing output of components of the user system is received by the user system over the network and demultiplexed and delivered to the component for output on the user system.

28 Claims, 17 Drawing Sheets

(56) References Cited

U.S. PATENT DOCUMENTS

| | | |
|---|---|---|
| 2005/0102377 A1 | 5/2005 | King et al. |
| 2006/0053216 A1* | 3/2006 | Deokar et al. ............... 709/223 |
| 2006/0161646 A1 | 7/2006 | Chene et al. |
| 2009/0287571 A1 | 11/2009 | Fujioka |
| 2010/0046532 A1* | 2/2010 | Okita ........................... 370/401 |
| 2011/0093917 A1 | 4/2011 | Alcorn et al. |
| 2011/0145341 A1* | 6/2011 | Hampel ....................... 709/206 |
| 2012/0246255 A1* | 9/2012 | Walker et al. ................ 709/208 |

\* cited by examiner

Figure 5

500 — Phyiscal Hardware Devices
Speaker
Microphone
Printer
Camera
Flash Drive
GPS
Mems 501 — Display Windows
Create
Resize
Full Screen 502 — Server Interaction
Copy/Paste
Drag/Drop
File Requests
Have Slaves

Figure 6

600
- User to Server Messages
  - Keyboard — Key codes from the keyboard
  - Mouse — Movement and buttons from the mouse
  - GPS — Location information from the GPS radio
  - Accel — Movement information from the accelerameter
  - Storage — File transfer between user and server
  - USB — USB commands/data to/from attached USB devices
  - MEMS — Position/orientation events from the MEMS device
  - Relay — Setup between two user devices (displays, etc)
  - Connect — User system is active, initial communcations with master server 601
- Server to User Messages
  - SlaveConnect — Connect to a slave server or wait for a connect from slave server
  - Window — Create a window that video will be placed in
  - Audio Control — Controls the volume, etc of the audio data
  - CursorFocus — Controls focus and cursor
  - Camera Control — Controls the camera
  - DRM — Digital Rights Manangement
  - Printer — Printer comamnds/data 602
- User to Server, Server to User, User to User Messages
  - Video — Graphis/Video, MPEG2, VC-1, H.264, etc
  - Audio — Audio to speaker from mic, AAC, G711, MP3, etc 603
- Higher level Server to Lower-Level Server Messages
  - Connect — Connect to a user system or wait for a connect from user system
  - Update — Updated user, user system or access right information 604
- Lower Server to Higher Server Messages
  - Request — Request additional access rights, functionality, files, ...

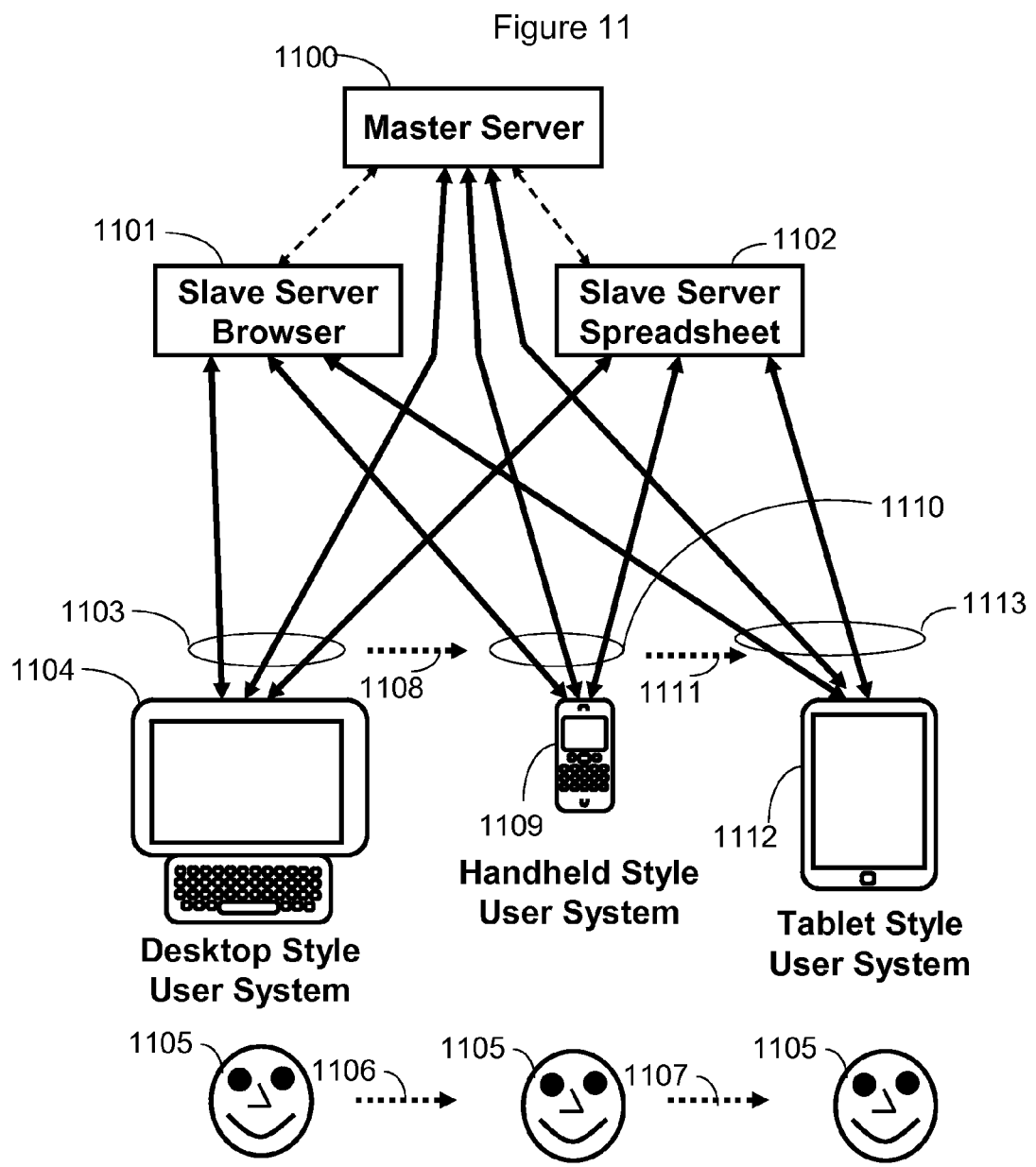

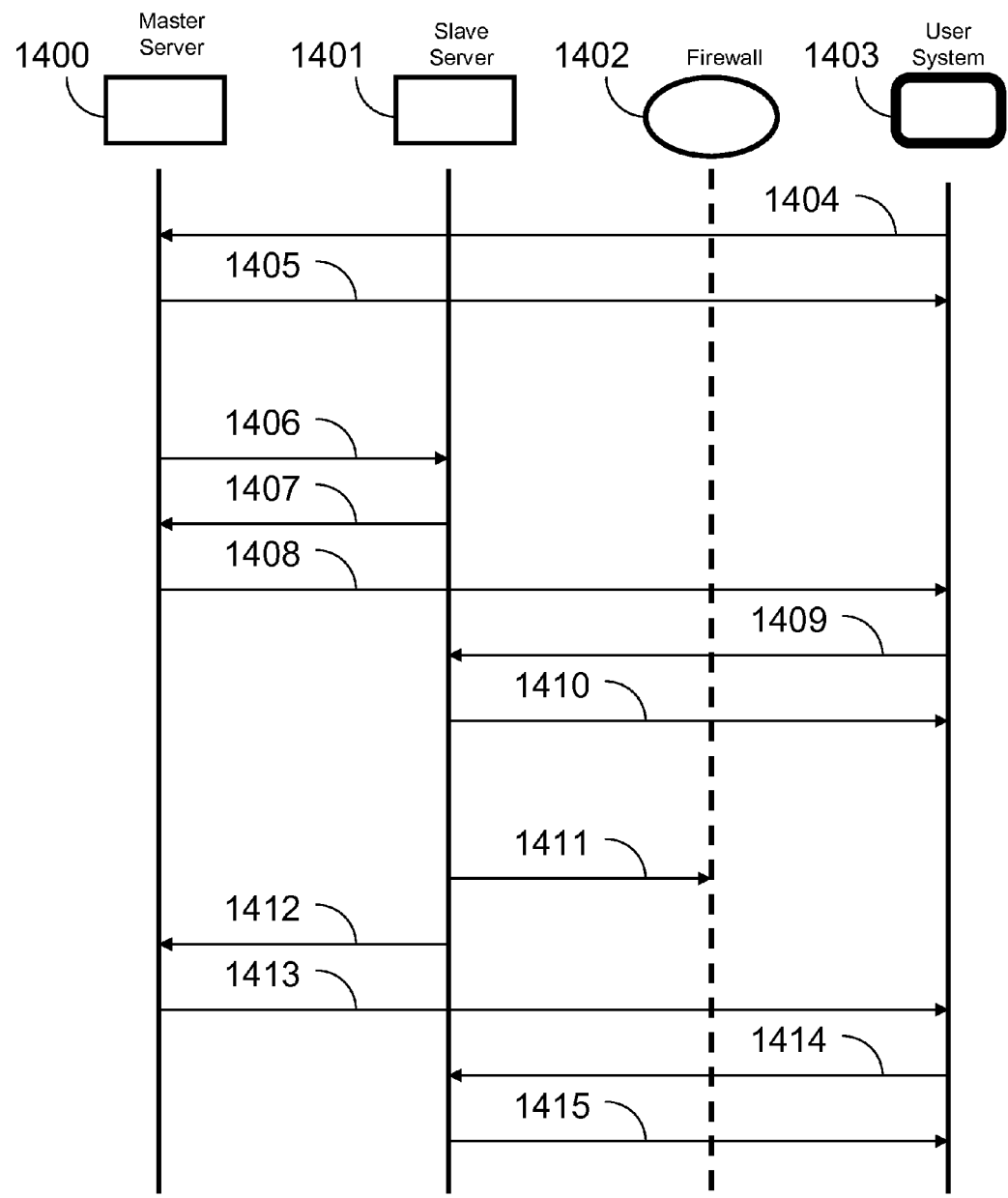

HIERARCHICAL DISPLAY-SERVER SYSTEM AND METHOD

CROSS-REFERENCE TO RELATED APPLICATION

The present application is a conversion of and has benefit of priority of the following application, which is and has at least one same inventor of the present application: U.S. Provisional Patent Application No. 61/354,799, titled "Hierarchical Display-Server System and Method", filed Jun. 15, 2010.

TECHNICAL FIELD

The present invention generally relates to server devices and non-intelligent user devices connected by a communication network, and more particularly relates to display-server systems including master server device and hierarchical slave server devices communicatively connected to user devices having display, input-output and networking components with limited or no processing capability.

BACKGROUND ART

Over the years there have been various types of computing systems. Four of the major types are server, client, client-server and display-server. All types of computing systems perform a computing task for a user.

Server systems consist of a single system where all computing is done in a central location and there is no user interaction with the computing task other then the initial starting of the task. A typical server system is a traditional mainframe.

Client systems consist of a single system that performs all computing, but in client systems there is constant user interaction with the computing task. Typical client systems are personal computers, laptops, smartphones and game consoles.

Client-server systems consist of both a server computing system and a client computing system which together perform a single computing task. These systems each separately operate as both a server system and a client system. Operating as both server and client, the client-server system performs a single computing task requiring user interaction in the task at least in connection with acting as client in the task. Typical client-server systems in use today are airline reservation systems and large retail store point-of-sale systems. A special type of client-server system is the web server/browser client. As is the case with any client-server application, the web server performs a single unique task, serving responses to requests received. However rather than having a unique client program associated with each server program, the browser program serves as a generic client program. The browser is used by all web servers. It will be noted that browsers presently may operate an application by downloading a program on the fly which is processed in the browser; therefore, web browser/server computing, particularly in instances of program download, is very similar to standard client-server computing.

Display-server systems consist of a server computing system and a non-intelligent user side system. A predominant aspect of this non-intelligent user system is a display. The user system is therefore sometimes referred to as a "display", hence the term display-server system for these types of computing systems. As with the server only computing system, substantially all computing tasks are performed by the server in the display-server system, and little, if any, computing (other than to the extent needed for input and output operations) is performed by the display. In these display-server systems, the display is, however, highly interactive with the computing task that is processed by the server. The server performs substantially all of the processing and other functions of a client system (of a client system type of computing system) because the display has only very limited, if any, processing capability. In effect, the display merely displays pixels corresponding to data (representing the pixels) received from the server by the display. In most cases, data (representing pixels for display) is delivered by the server to the display for viewing (such as a video stream or other data stream) and low-level user events at the display (such as keystroke and mouse movements) are sent natively by the display to the server.

Display-server computing is the least employed arrangement for present computing systems, but display-server systems can provide benefits and are expected to grow in popularity. A typical display-server computing environment is called zero-client computing. In zero-client computing, a desktop operating system (OS) and applications are processed by a server (instead of by a client system, such as the typical personal computer). The user side system is often primarily a non-intelligent "thin-client" device, coupled with a display and keyboard (or other input and output device(s)).

Another environment in which display-server computing is employed is 3D games. The 3D games are processed by a server system, generally a high performance server computer, and the server system delivers a pixel video stream of the game to a very "thin-client" user side system connected to a television set. A traditional game controller input device at the user side system communicates inputs of a user to the server system during game play.

It would be advantageous, therefore, to provide greater operational flexibility and increased scalability for display-server systems.

SUMMARY

An embodiment of the invention is a display-server system including a display-"hierarchical multiple server" system. The display-server system includes one or more non-intelligent user system (the display) connected over a network to a plurality of server devices connected in a controlled hierarchy.

The user system includes a display, one or more input-output components, such as keyboard, mouse, speakers, microphone, and/or other similar peripheral devices, and a network interface connector communicatively connected to a communication network. The user system sends over the network very low-level data representing inputs/actions by a user via the peripheral device, to a server system communicatively of the network. The server system, likewise, communicates over the network to the display or another peripheral device very low-level data representing results of an operation by the server system, such as in response to the peripheral device. The low-level data so communicated represents, for example: pixels (video) sent by the server system to the display of the user system, a user's input to a keyboard of the user system sent by the keyboard to the server system, audio samples sent by the server system to the speaker of the user system, etc. Processing is limited for the user system, for example, the user system may only perform multiplexing and demultiplexing of communications as may be required for the network. Multiplexing and demultiplexing may be required, for example, to transform native data types employed in components of the user system to/from network messages suitable for communication over the network.

The servers are arranged in a hierarchy with a single master server and multiple sets of cascading slave servers. The master server communicates with the first-level slave servers and the first-level slave servers communicate with the second-level slave servers and so on. All servers are capable of communicating directly with the user system. The master server has complete control of all respective components of the user system. The master server provides each lower-level slave server in the hierarchy an equal or lesser amount of control, respectively, over respective component(s) of the user system. The master server informs the user system component(s) which low-level server(s), if any, can controllingly access the component. This hierarchical access by respective slave servers of the hierarchy and by the master server to the respective components of the user system flexibly and extremely securely allows processing by the servers, and input/output by the components of the user system without significant processing required of the user system.

The user system and hierarchical server system are generally located remotely each from the other, and the user system and server system communicatively connect over a physical communication network, such as Ethernet, Wi-Fi, 3G, or other data network. In certain alternatives, the user system and server system, however, can be contained in a single physical device and the network, in such event, is a local wire or other local link of the device.

The combined user system and server system, whether embodied as a non-intelligent user system and hierarchical server system, as a single physical device, or other similar arrangement, is herein sometimes referred to as a hierarchical display-server system which operates for hierarchical display-server computing.

BRIEF DESCRIPTION OF THE DRAWINGS

The present invention is illustrated by way of example and not limitation in the accompanying figures, in which like references indicate similar elements, and in which:

FIG. 5 illustrates exemplary access/control rights that a master server and slave servers of a hierarchical server system may have to respective components of a user system, according to certain embodiments of the invention;

FIG. 6 illustrates example messages communicated between the server system and user systems, in operation of a hierarchical display-server system, according to certain embodiments of the invention;

FIG. 11 illustrates an exemplary server system in operation, in which a non-stationary user moves between multiple user systems, according to certain embodiments of the invention;

FIG. 14 illustrates communications, in presence of a firewall, between each of the master server, slave servers and the display and speaker of the user system of FIG. 7, according to certain embodiments of the invention;

DETAILED DESCRIPTION

Figure 1:
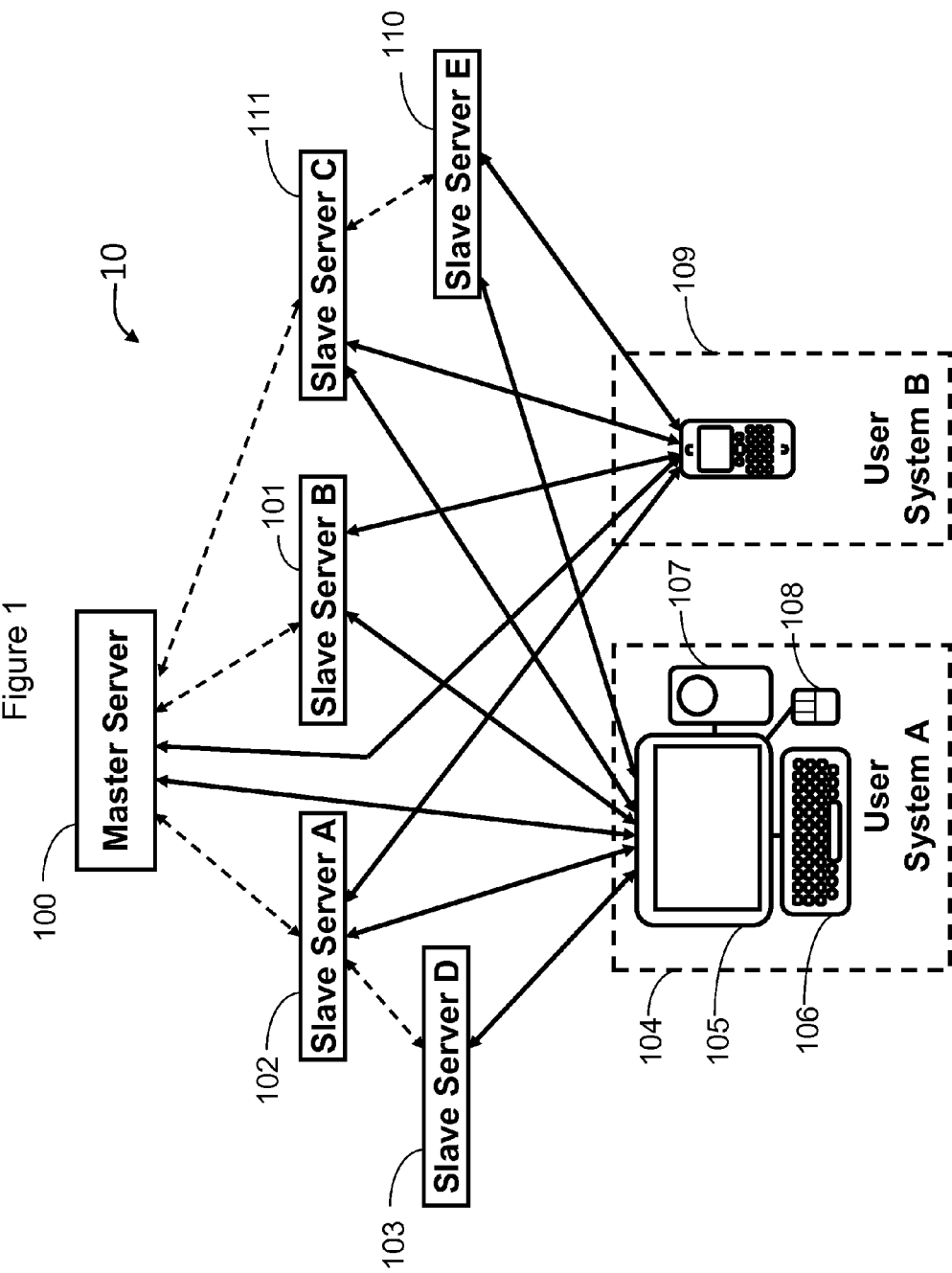
FIG. 1 illustrates a hierarchical server system and two non-intelligent user systems connected by a network, according to certain embodiments of the invention.

Referring to FIG. 1, a hierarchical server system 10 includes a master server 100 communicatively connected, respectively and either directly or indirectly, to five slave servers: slave server A 102, slave server B 101, slave server C 111, slave server D 103 and slave server E 110. The server system 100 communicatively connects, such as over a communications network, to a user system A 104 and to a user system B 109. The master server 100 particularly connects to three first-level slave servers: slave server A 102, slave server B 101 and slave server C 111. Two of these first-level slave servers (slave server A 102 and slave server C 111) connect to second-level slave servers: slave server A 102 connects to slave server D 103 and slave server C 111 connects to slave server E 110.

User system A 104 is a desktop style non-intelligent user system, for example, comprising four physical components: display 105, keyboard 106, mouse 108 and speaker 107. The keyboard 106, mouse 108 and speaker 107 connect to the display 105. The display 105 includes a network interface for connection to a communications network communicatively connected to the server system. User system B 109 is a handheld style non-intelligent user system, such as a cell phone, a tablet display, a personal digital assistant, or communicative mobile device. User system B 109 comprises, for example, a display and keyboard contained within a single unitary housing. Both the user system A 104 and the user system B 109 can communicatively connect to all servers 100, 101, 102, 111, 103, 110 of the server system, such as over a communication network.

A master server has access to all the components of each user system in communication with the master server. Master server 100, for example, through communicative access over the network, controls all components of user system A, i.e., each of the keyboard 106, mouse 108 and speaker 107 of the user system A 104, and each similar component, although integrated in single unitary housing, of the user system B 109, i.e., display and keyboard of the user system B 109. Therefore, for example, master server 100 can send video to any portion of user system A's 104 display 105 and play audio on speaker 107. Master server 100 receives communications over the network through inputs to the user system A's 104 keyboard 106 and mouse 108. The master server 100, likewise, communicatively accesses each component of the user system B 109.

A master server can provide access to any of a user system's components to slave servers (or any of these) connected to the master server. Master server 100 can give slave server A 102 access to all or certain of user system A's 104 display 105, for example, and the slave server A 102 then can communicatively control the display 105, such as to display video. In another example, the master server 100 can give slave server A 102 access to user system A's 104 speaker 107, and slave server A 102 can thereby communicatively control the speaker 107, such as to play a tone or other sound.

A slave server can provide access to any of a user system's components to lower-level slave servers connected to the slave server. Slave server A 102, if provided access to user system's A 104 speaker 107 by the master server 100, for example, can provide that access to slave server D 103 (i.e., a lower-level slave server). Slave server D 103 thereby can communicatively control the speaker 107 of the user system A 104. The user system A 104 mixes all audio received for the speaker 107. When a server provides a lower-level server access to a user system component, the user system is informed of that access. If a user system has not been informed that a particular server can access a given component, then the user system will ignore all communications for that given component from that server.

The connections between servers and between servers and user systems are network connections such as Ethernet, WiFi, 4G, WiMax, or any other communicative network or combination of such networks.

Figure 2:
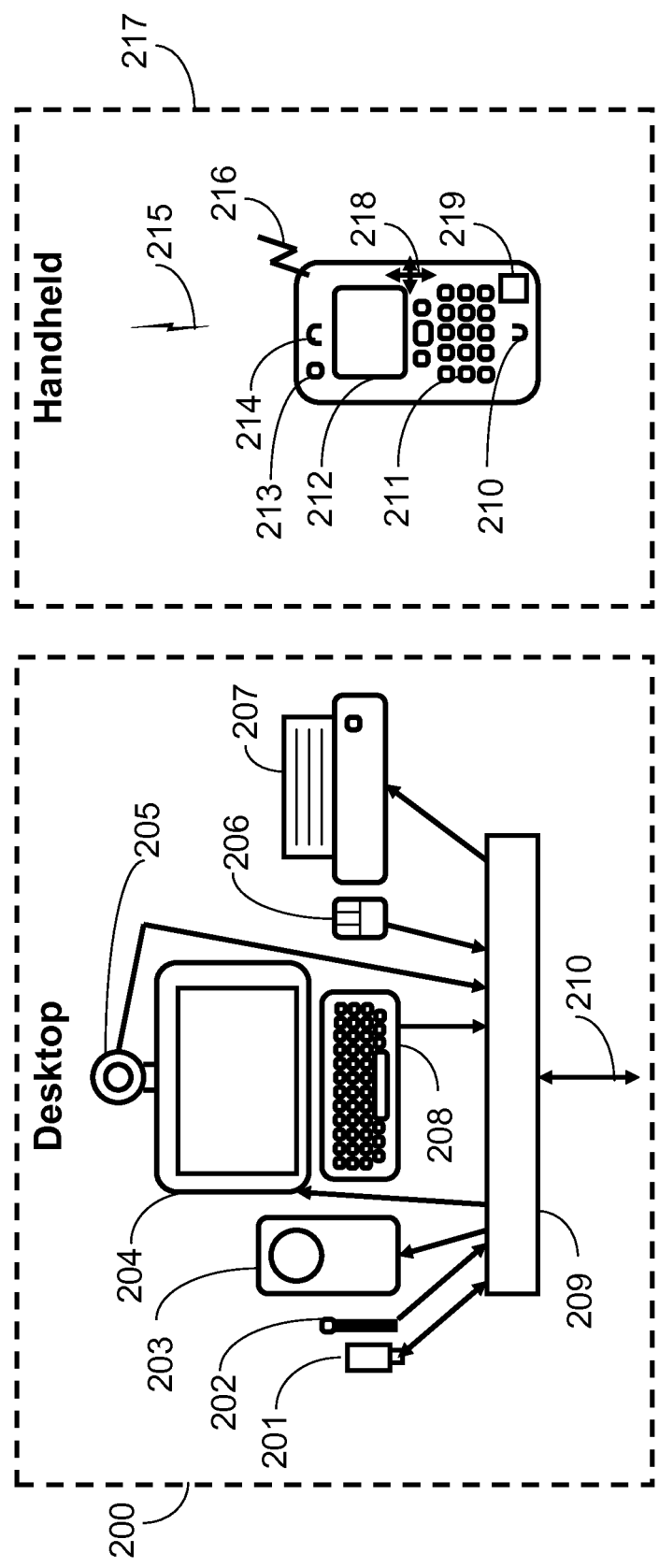
FIG. 2 illustrates two exemplary typical user systems: an exemplary desktop user system and an exemplary handheld user system, according to certain embodiments of the invention.

Referring to FIG. 2, two exemplary, but non-exclusive, types of user system are a desktop user system 200 and a handheld user system 217. The desktop user system 200 includes, for example, physically separate components of: USB flash drive 201, microphone 202, speaker 203, display 204, camera 205, mouse 206, printer 207 and keyboard 208. All of the components 201-208 connect to a control unit 209, which in turn is connected to the network 210. The control unit 209 may physically be built into one of the other components such as the display 204, or the control unit 209 may be a separate processor of the desktop user system 200 employed only for limited control operations (e.g., no significant operating system operations). An exemplary control unit is later described with respect to FIG. 3. The handheld user system 216 includes, for example, similar basic, but all internal, components of: microphone 210, keyboard 211, display 212, camera 213, speaker 214, control unit 219 and network interface 215. In the example, the handheld user system 217 does not have a printer, mouse or flash drive, as does the desktop user system 200. The handheld user system 217, however, has a GPS unit 216 and MEMS 218 components not present in the desktop user system 200 in the example. The network connection 210 of the desktop user system 200 can be wired, such as Ethernet, or wireless, such as WiFi, 4G, WiMax, or other communications network or combination thereof. The network connection 215 of the handheld user system 217 is wireless, for example. The desktop user system 200 and the handheld user system 217, although examples only, illustrate devices and components of the devices as may be operable in the embodiments. Other devices and components, with at least network communication capabilities and certain of the features, are also or alternatively possible in embodiments.

Figure 3:
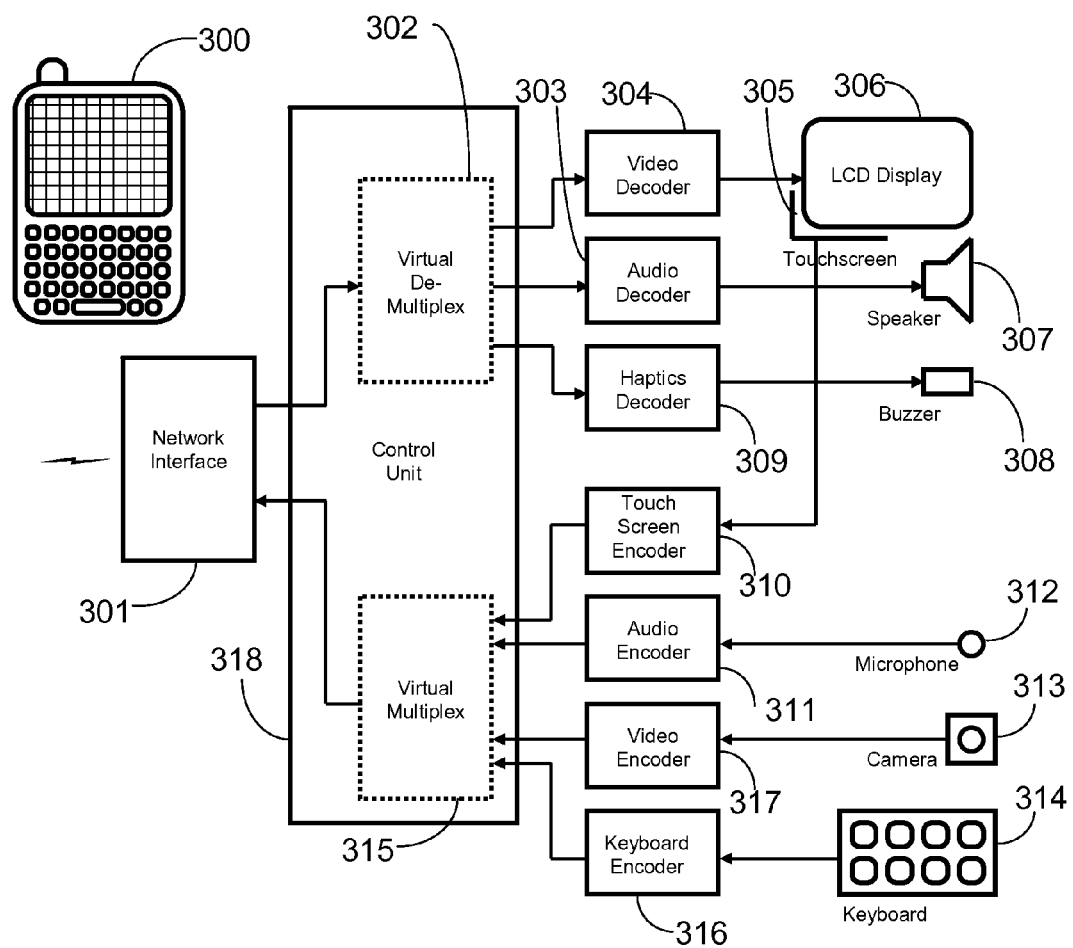
FIG. 3 illustrates exemplary components of an exemplary handheld user system, according to certain embodiments of the invention.

Referring to FIG. 3, a detailed internal component/functionality block diagram of a typical user system, such as a small handheld device 300, includes hardware components: LCD display 306, speaker 307, buzzer 308, touchscreen 305, microphone 312, camera 313 and a keyboard 314. All hardware components interface to logic circuitry of the device 300 that transforms low-level data of the device 300 into data that can be communicated over the network. A control unit 318 of the device 300 controls the overall operation of the device 300, including the components. Messages received over the network interface 301 are processed by the control unit 318, which virtually de-multiplexes 302 the messages and delivers the appropriate de-multiplexed message data to respective component for the data. A video decoder 304 converts the received network communications data for delivery to the LCD display 306. Video decoder 304 can be a standard MPEG2, H.264, VC-1 style decoder or a propriety video decoder. Audio decoder 303 converts the network data into analog signals for delivery to the speaker 307. Audio decoder 303 can be a standard AAC, MP3, G711 style decoder or a propriety audio decoder. A haptics decoder 309 converts the network data into a format for driving a buzzer 308. The opposite is true for outgoing messages, in which the control unit 318 virtually multiplexes 315 message data from the respective component and creates messages for delivery to the network interface 301 for network communications. The touchscreen encoder 310 converts data from the touchscreen 305 for delivery over the network. The audio encoder 311 converts the analog data from the microphone 315 into digital data for delivery over the network. The formats of the audio encoder 311 data are the same as the formats of the audio decoder 303 data. The video encoder 317 converts data from the camera 305. The formats of the video encoder 317 data are the same as the formats of the video decoder 304 data. No substantial processing of data is performed by the user system; rather, the user system converts data generated by the hardware of the device 300 and received by device 300 into outgoing network messages and from incoming network messages, respectively, in form communicatable over the network and useable by the hardware, respectively.

Figure 4:
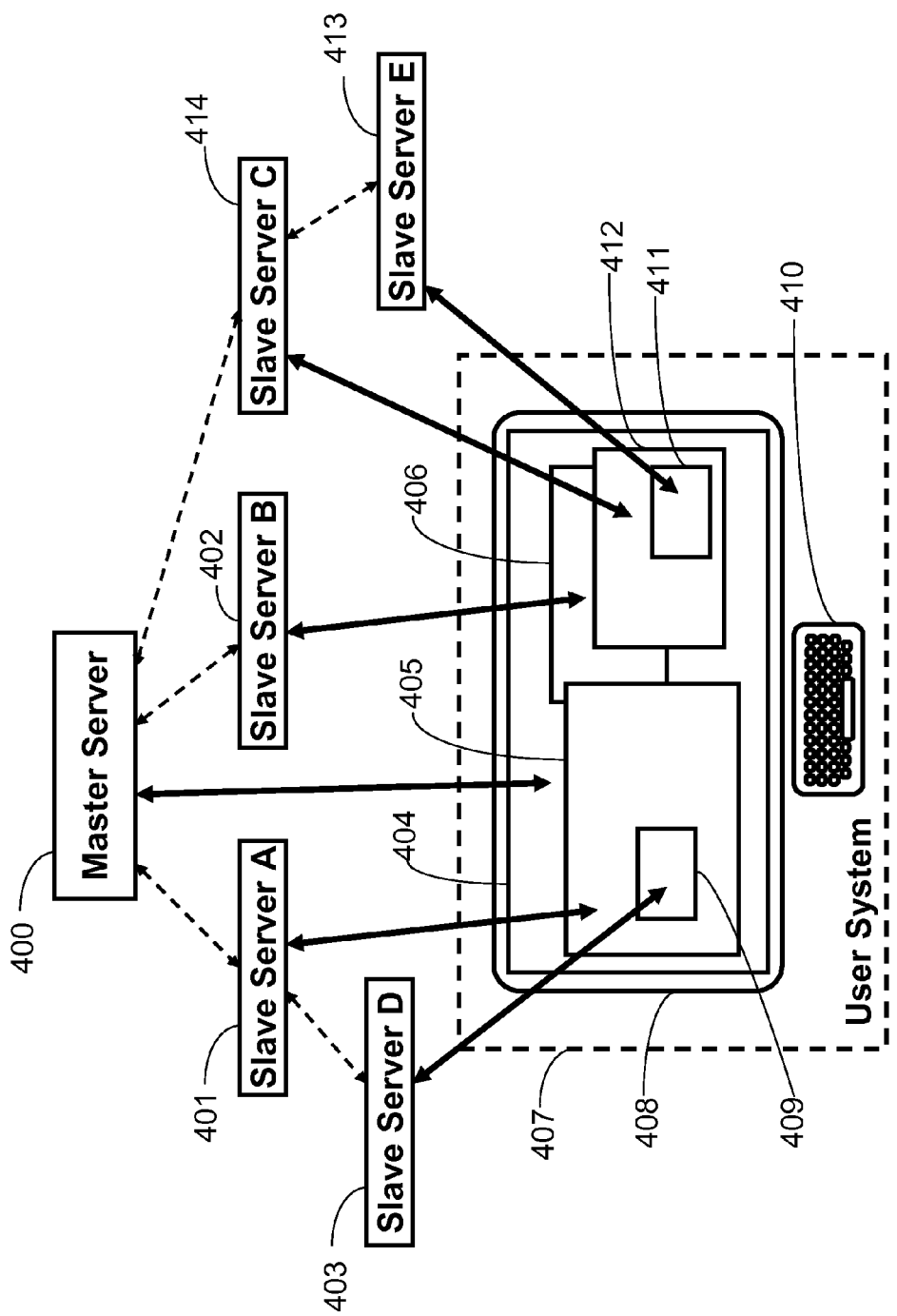
FIG. 4 illustrates an exemplary hierarchical server system in communicative connection to an exemplary user system display, including windows displayed through control of the server system, according to certain embodiments of the invention.

Referring to FIG. 4, hierarchical servers, such as that previously discussed, permitted to communicate with a user system, each create a respective window and thereby multiple windows are displayed by the user system (i.e., one distinct window for each server). The respective servers are permitted access rights to the respective windows of the display. A server that has access to a window, for example, sends pixels representing graphical displays to fill that window. The pixels can be the graphics output of an application such as a browser or spreadsheet, the pixels can be video (either live or read from a hard drive), or the pixels can be other media as applicable in the embodiment.

The servers of FIG. 4 have hierarchical association, such as that of the servers of FIG. 1, to wit: master server 400 and five slave servers A 401, B 402, C 414, D 403 and E 413. Master server 400, in the example of FIG. 4, has access rights to the complete display 408 and has created window 404, which covers the entire area of the display 408 and fills window 404 with pixels representing graphical displays in the window 404 (or video or other media, as applicable). Master server 400 has also created window 405 and given slave server A 401 access rights to fill window 405 with pixels representing graphical or other displays in the window 405. In turn slave server A 401 has created window 409 and given slave server D 403 access rights to fill window 409, for example, with pixels representing a different or same graphical or other display. Master server 400 has created window 406 and given slave server B 402 access rights to fill window 406 also, for example, with pixels representing a different or same graphical or other display or media. Master server 400 has created window 412 and given slave server C 414 access rights to fill window 412, such as with pixels also representing a different or same graphical or other display. In turn, slave server C 414 has created window 411 and given slave server E 413 access rights to fill window 411, also with pixels representing same or different graphical or other display. FIG. 4 shows that higher-level servers create windows and lower-level servers fill the windows with pixels; for each lower level server, the window created for that particular server on the user system display is the only location in which the lower-level server's pixels will be displayed. Slave servers can only create windows that are contained within the window (or windows, as applicable) to which the respective slave server is given access rights by the master server 400 or a higher priority slave server of the hierarchical association.

Referring to FIG. 5, certain exemplary access rights, according to certain embodiments, are given slave servers by higher level servers, as applicable. There are, for example, three general categories of access rights: physical components 500, windows on a display 501 and server to server interaction 502. For physical components 500, a particular server either has or does not have right to access (and thus operationally use) the component. Display windows 501 are created hierarchically, as discussed in connection with FIG. 4 and as further later described with respect to FIG. 7. A higher-level server creates a window and gives a lower-level server access rights to fill that window. There are various server to server interactions 502 that have access rights associated with them. Servers can be given access rights to copy/paste and drag/drop information exchanges, access rights to files as further later described with respect to FIG. 15, access rights to exchange private server to server communications and others. Also a slave server can request access for file operations from a higher priority server. Moreover, a slave server may need, and so may request, access to lower-level slave server or servers, where such access is required.

Referring to FIG. 6, certain exemplary network messages flow between server and user system, between server and server and in a few cases between respective two or more user systems. For example, user-to-server messages 600 provide data representing inputs or directions from hardware components, such as keyboard, mouse, GPS, or other input or direction, of the user system to the server via network communication. A connect message, for example, is the first message that a user system sends to commence communications with the master server. Server-to-user messages 601 provide, for example, data/control representing directions or instructions for hardware components of the user system, such as printer, speaker (volume) and camera. At least certain of the server-to-user messages 601 are data representing commands for user system windows and digital rights management (DRM). One message category 602 consists of audio and video messages which can be sent between server and user system, user system and server and directly between user systems. Higher-level servers send messages to lower-level servers 603 and also a lower-level server sends messages to the higher-level server 604.

Figure 18:
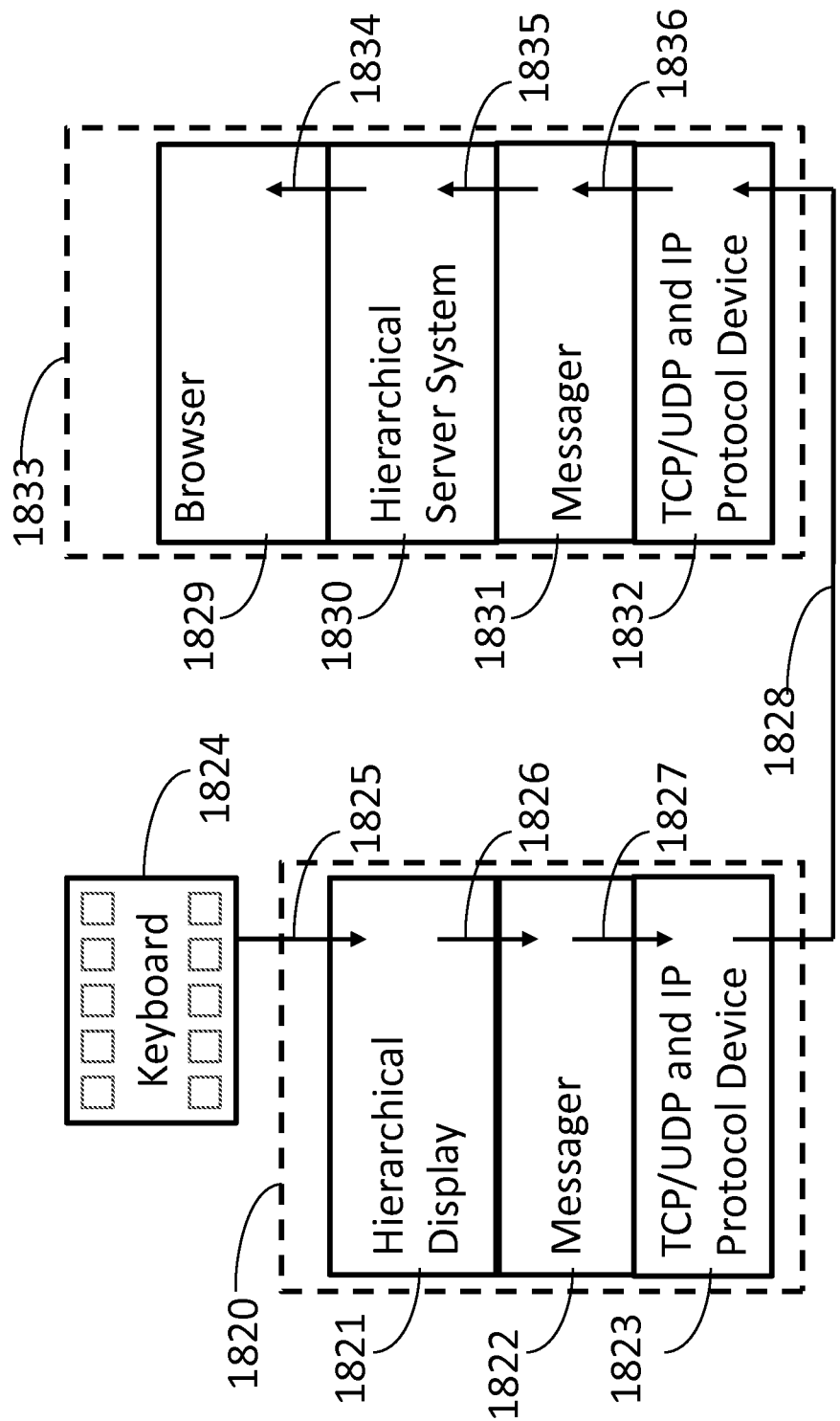
FIG. 18 illustrates a hierarchical display-server system in communicative operation with a user system in communication over a network, including an exemplary key stroke message input via a keyboard of the user system, the key stroke message input being received and processed by a browser of the hierarchical display-server system, according to certain embodiments of the invention.

Referring to FIG. 18, an exemplary user system 1820 and server system 1833 (which server system can be any of a master server or any higher- or lower-level server permitted access to the user system) in operation includes a keyboard input of the user system 1820 communicated to a browser 1829 of the server system 1833, such as a browser software application processed by the server system 1833. The user system 1820 includes a user-side hierarchical display system 1821 capable of processing communicated instructions of the server system 1833 and performing corresponding displays or other output operations at the user system 1820 in response. The user system 1820 also includes a messager 1822 and a communication unit 1823 (such as a TCP/UDP and IP software and/or hardware unit for protocols and communications with server systems in a hierarchical arrangement). The user system 1820 further includes a keyboard 1824 or other input device.

The server system 1833 includes the browser 1829. The server system 1833 also includes a hierarchical system 1830 capable of hierarchical interaction and arrangement with other server systems in a hierarchical display server system according to the embodiments. Additionally, the server system 1833 includes a messager 1831, and a communication unit 1832 (such as a TCP/UDP and IP software and/or hardware unit or components for protocols and communications with the user system 1820 and other server systems in a hierarchical arrangement).

In operation, a keystroke 1825 at the keyboard 1824 (such as may be entered by a user of the user system 1820) is detected by the user-side hierarchical display system 1821. The hierarchical display system 1821 processes the detected keystroke 1825 to determine that data representing the keystroke 1825 should be communicated to the server system 1833. The hierarchical display system 1821 then passes data 1826 representing the keystroke 1825 to the messager 1822. The messager 1822 formats the data representing the keystroke 1825 as a message 1828 readable by the server system 1833. The messager 1822 communicates the message 1827 to the communication unit 1823. The communication unit 1823 formats and communicates the message 1827 to the server system 1833, such as over a communications network according to an applicable TCP/UDP IP packet protocol of the communicated message 1828.

The communication unit 1832 of the server system 1833 communicatively receives from the network the communicated message 1828. The communication unit 1832 extracts a message 1836 (corresponding to the message 1827) from the communicated message 1828, and delivers the message 1836 to the messager 1831. The messager 1831 determines that the message 1836 represents a keystroke 1825 input to the keyboard 1824 of the user system 1820 and delivers the message 1836 as an input 1835 to the hierarchical system 1830 of the server system 1833. The hierarchical system 1830, on such input 1835, extracts therefrom a browser input 1834 representing the keystroke 1825 at the user system 1820. The browser input 1834 is communicated to the browser 1829 by the hierarchical system 1830. The browser 1829 then processes the browser input 1834 for operations in communication with and display or other output at the user system 1820.

Figure 7:
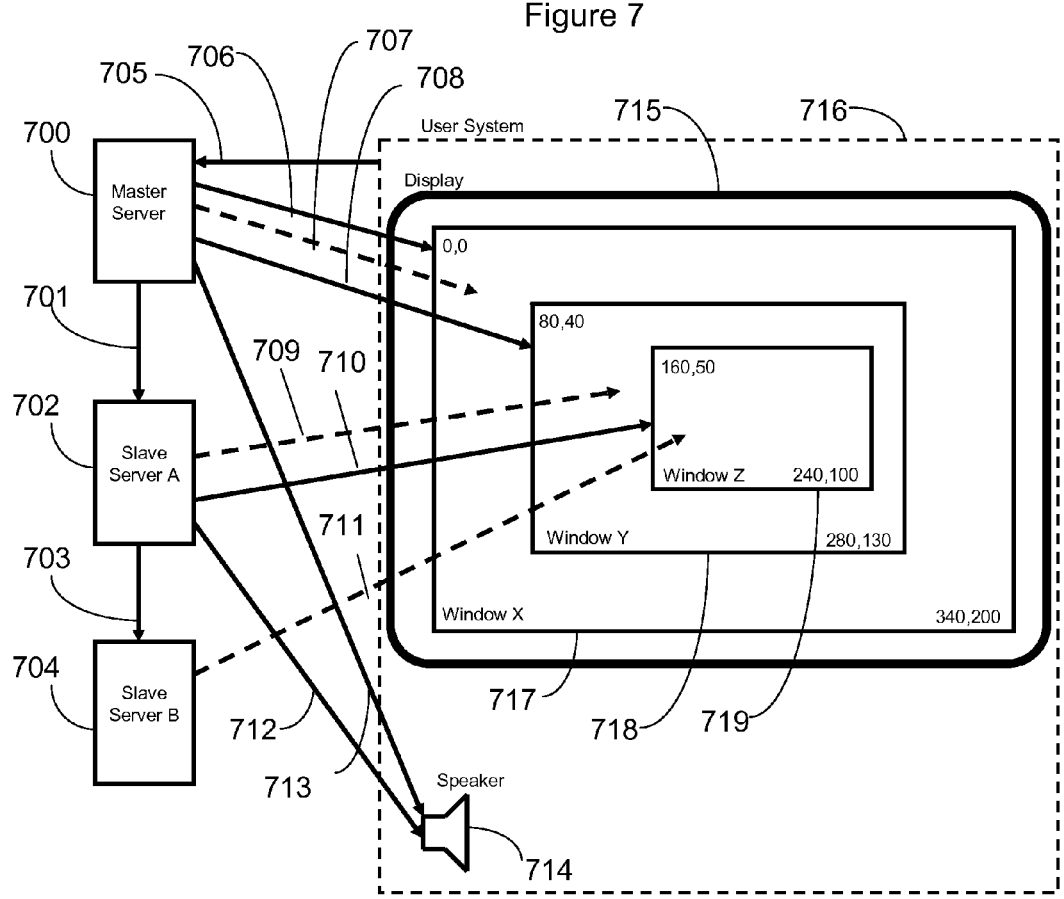
FIG. 7 illustrates an exemplary master server with two exemplary slave servers in operation of a display and a speaker of a user system, according to certain embodiments of the invention.
Figure 8:
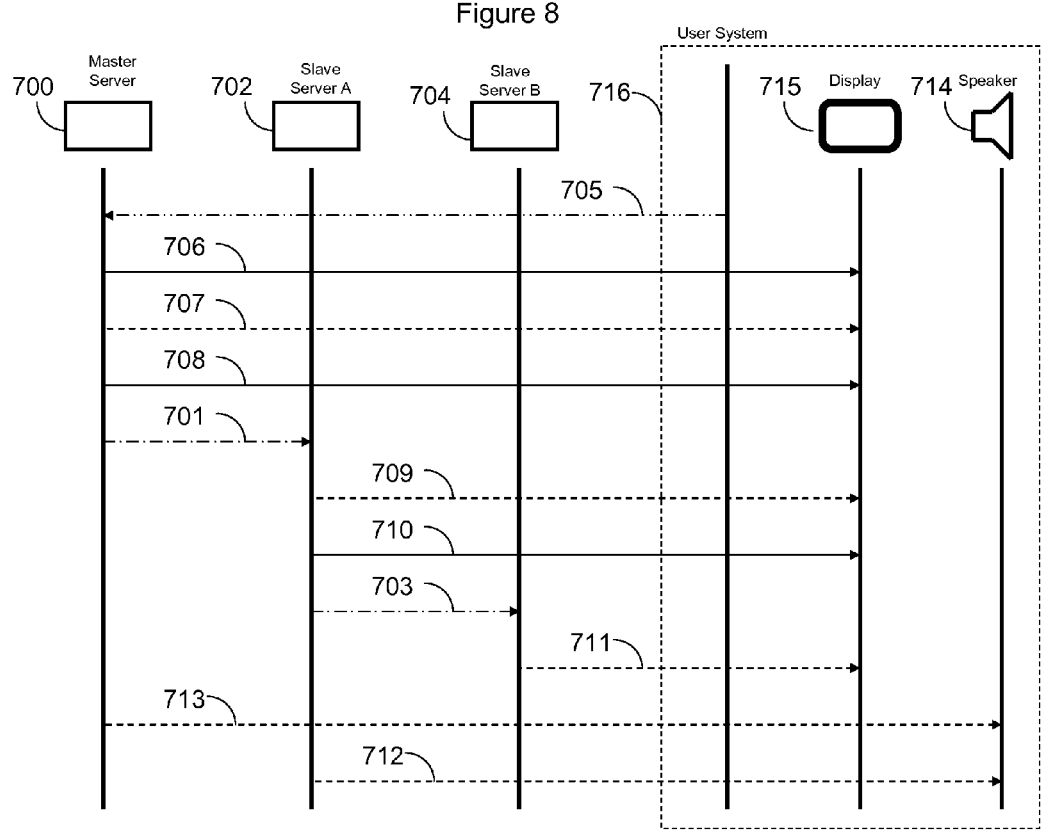
FIG. 8 illustrates communications between each of the master server, slave servers and the display and speaker of the user system of FIG. 7, according to certain embodiments of the invention.

FIG. 7 and FIG. 8 illustrate exemplary interaction of a master server 700 with two slave servers 702, 704 and a user system 716 consisting of a display 715 and a speaker 714. FIG. 7 shows the interaction pictorially. FIG. 8 illustrates the step-by-step process of setting up this interaction. When the user system 716 powers-on it sends a connect 705 message to the master server 700. The master server 700 responds with window 706 message to create window X 717 at coordinates 0,0. The master server 700 then sends the video 707 (in the example) to fill window 717 with pixels representing a video media for display in the window X 717 of the user system 716. The master server 700 then sends window and slave connect 708 messages to the user system 716. The window message 708 creates window Y 718 at coordinates 80,40 and the slave connect portion of the message 708 informs the user system 716 that slave server A 702 will connect. The access rights that the slave server A 702 has are also part of the connect message 708. Master server 700 sends a connect 701 message to slave server A 702 informing it to connect to the user system 716. Slave server A 702 now sends the video 709 message (in the example) to user system 716 that fills window Y 718 with pixels representing a video media for display in the window Y 718.

A similar process now repeats for window Z 719. Slave server 702 sends a window and a slave connect 710 message to the user system 716. The window command creates window Z 719 at coordinates 160,50 and the slave connect portion of the message informs the user system 716 that slave server B 704 will connect. The access rights that the slave server B 704 has are also part of the message 710. Slave server A 702 sends a connect 703 message to slave server B 704 informing it to connect to the user system 716. Slave server B 704 now sends the video 711 message (in the example) to user system 716 that fills window Z 719 with pixels representing a video media displayed in window Z 719.

Now both master server 700 and slave server A 702 send audio 713, 712 messages (further according to the example) to the user system 716. The user system 716 mixes the audio and plays it on the speaker 714. In order for user system 716 to accept audio from slave server A 702, the master server 700 would have informed the user system 716 that slave server A 702 has speaker access rights.

Figure 9:
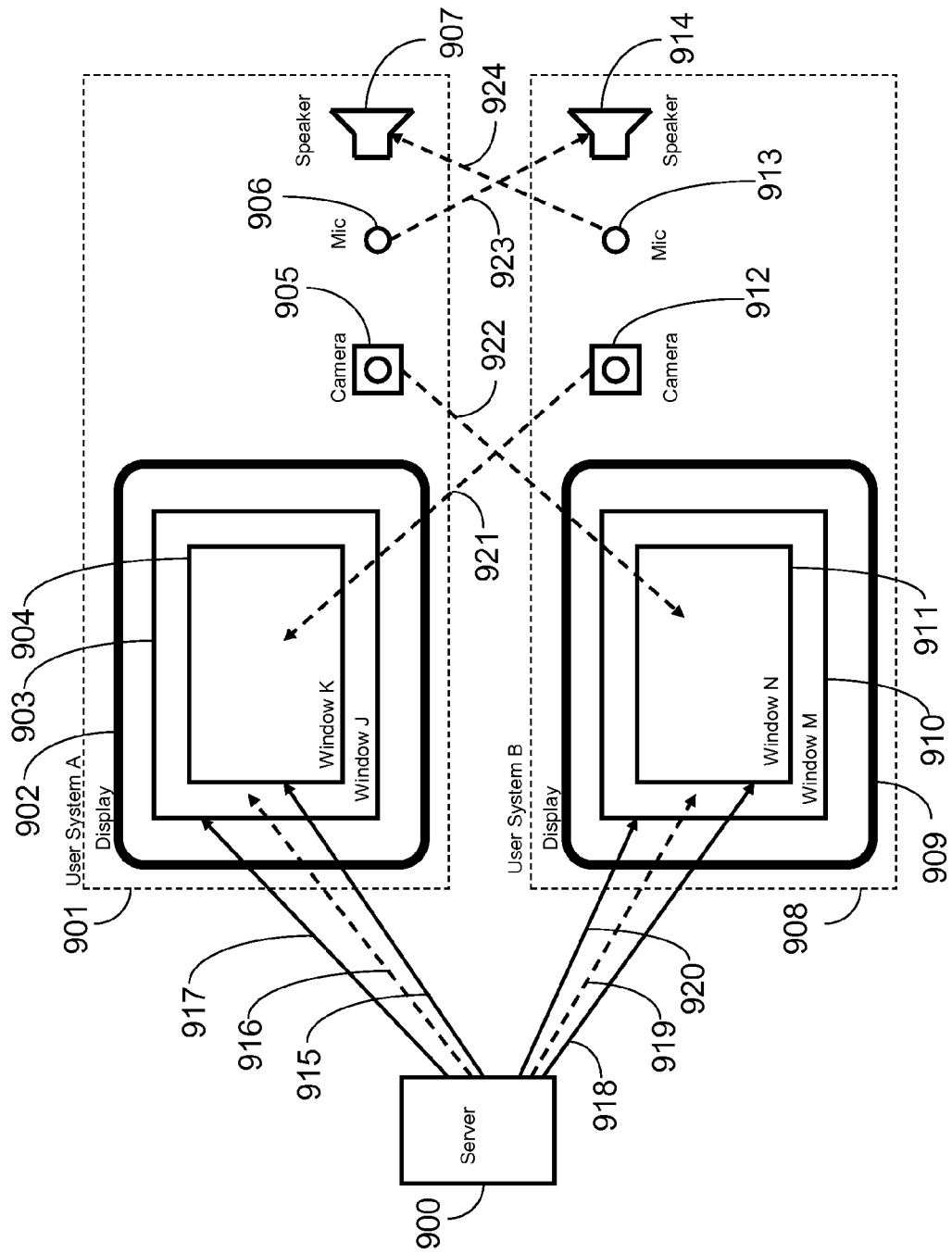
FIG. 9 illustrates an exemplary server system communicating with two user systems, respectively, where the user systems also communicate with each other, according to certain embodiments of the invention.

Referring to FIG. 9, in an exemplary embodiment of the detailed interaction of a server 900 and two user systems 901 and 908, the user systems 901 and 908 are sending audio 923, 924 and video 921, 922 messages directly to each other. A configuration such as depicted in FIG. 9 could be used, for example, in a video/audio conference between the two users. Server 900 sends message 917 to create Window J 903 and sends message 915 to create Window K 904 on the display 902 of the user system A 901. Server 900 sends video 916 message that fills Window J 903 with pixels representing the audio and video media for display on the user system A 901. Server 900 then creates a similar set of windows on the display 909 of user system B 908: window M 910 and Window N 101 in the example. Server 900 fills Window M 910 with video 919 message. Server 900 then informs user system A 901 and user system B 908 that they each have access to the other's respective speakers and display windows, respectively. Therefore user system B 908 sends video 921 message from camera 912 to window K 904 of user system A 901. Similarly user system A 901 sends video 922 message from camera 905 to window N 911 of user system B 908. Audio is exchanged similarly between each respective user system's microphone and speaker. User system A's 901 microphone 906 sends audio 923 messages to user system B's 908 speaker 914 and user system B's 908 microphone 913 sends audio 924 messages to user system A's 901 speaker 907. Video and audio are common components for which access is permitted to a user system, but access rights to any component may be passed on from a server to a user device, thereby allowing the user device to communicate with another user device in this manner.

Figure 10:
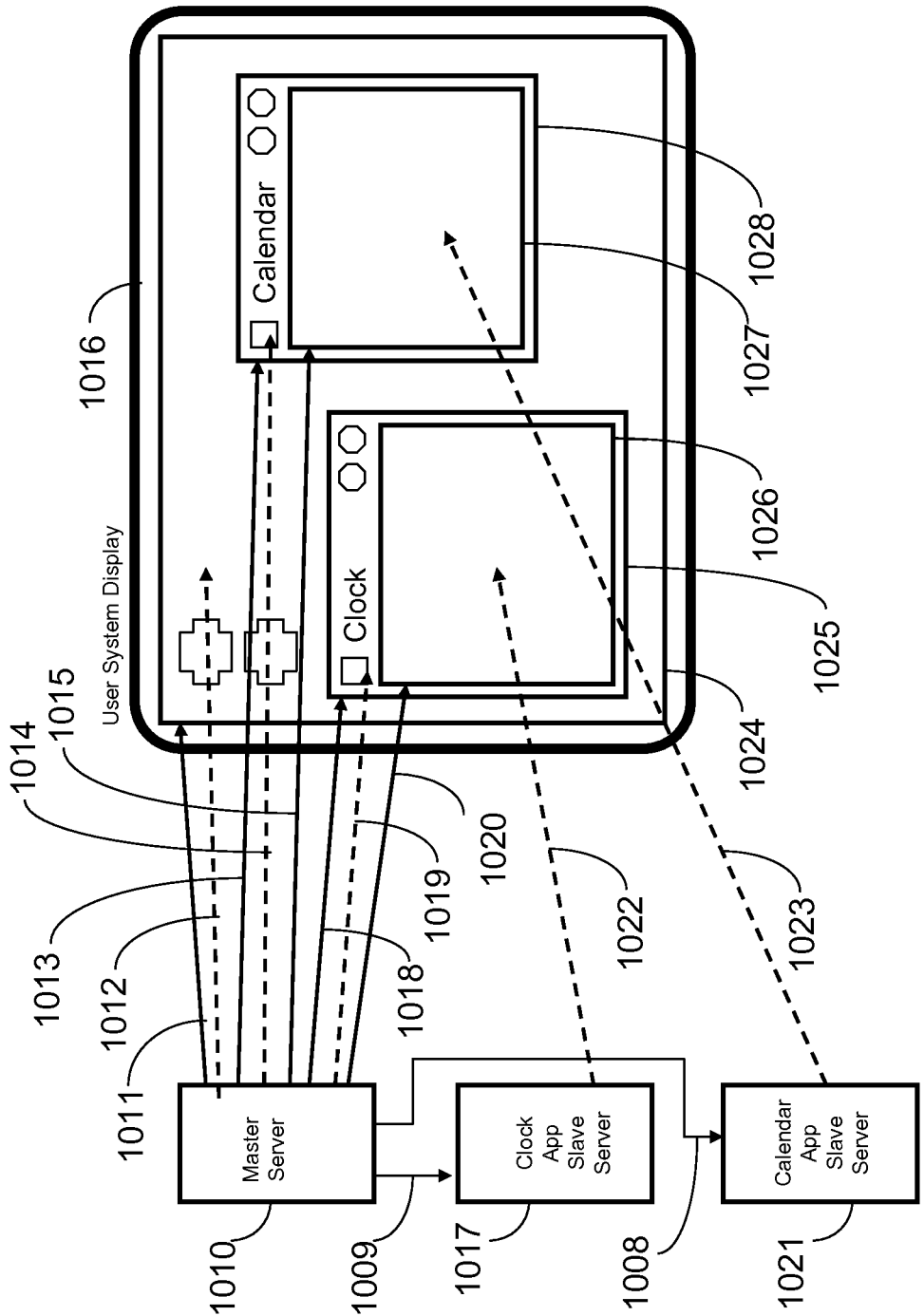
FIG. 10 illustrates an exemplary desktop style user interface implemented in a user system by a server system, according to certain embodiments of the invention.

FIG. 10 illustrates an exemplary standard desktop style user interface of a display of a user system, in accordance with embodiments. In the example, the standard desktop style user interface includes a background desktop along with respective window frames each containing a respective application unit. The window frame of each application unit can provide for resizing, minimizing, maximizing and closing the application unit. The window frame can additionally provide for moving the window of the application unit to different location of the display. In the embodiment, a master server 1010 and two slave application servers 1017, 1021 connect to a user system display 1016. The master server 1010 sends a window 1011 message and a video 1012 message to create and fill in the main desktop window 1024 with pixels representing graphic, text and/or video media. Desktop window 1024 contains the desktop background and desktop icons used for starting application units. When it is desired to start a Clock application unit, for example, master server 1010 sends a window 1018 message and a video 1019 message to the user system display 1016. These messages create and fill in the frame window 1025 pixels representing a clock or other timing media. Master server 1010 also sends a window 1020 message to user system display 1016 to create an application window 1026 of the Clock application unit. Master server 1010 then sends a connect 1009 message to a slave server 1017 which can serve a Clock application message. Slave server 1017 then sends the video 1022 message to fill the application window 1026 with the Clock application's pixels representing the clock or timer.

A similar process occurs when a slave server 1021 capable of serving a Calendar application message is commenced communicating with a user system display 1016. Master server 1010 sends a window 1013 message and video 1014 message to the user system display 1016, directing the display 1016 to create and fill in a frame window with pixels representing the calendar, such as the frame window 1028. Master server 1010 sends a window 1015 message to create a Calendar application window 1027. Master server 1010 then sends a connect 1008 message to the slave server 1021. The slave server 1021 sends the video 1023 message to fill the Calendar application window 1027 with pixels representing the calendar. A standard desktop environment can thereby be created in a user system, in a very secure manner, each respective application unit having limited rights to the user system to fill windows, such as with pixels representing text, graphics, video or other media of software programs or other operational units of and processed by the applicable master and slave server system.

Referring to FIG. 11, an exemplary embodiment of a plurality of servers, in a hierarchical association, can service a particular user of respective ones of a plurality of user systems, as the user moves from one user system to another of the user systems. In the example embodiment, master server 1100 connects to slave server Browser 1101 and slave server Spreadsheet 1102. There are three user systems according to the embodiment: a desktop user system 1104, a handheld user system 1109 and a tablet user system 1112. There is only a single user 1105, who periodically can move from one user system to another. Initially, the user 1105 is operating the desktop user system 1104. The respective servers are interconnected, in the example, with connection set 1103 to the desktop user system 1104 as has been described. If the user discontinues using the desktop user system 1104 and moves 1106 to use the handheld user system 1109, the handheld user system 1109 next sends a connect message to master server 1100.

The master server 1100 then determines/detects/ascertains that the user 1105 has moved to the handheld user system 1109, and master server 1100 communicatively informs slave server Browser 1101 and slave server Spreadsheet 1102 of the user's movement from desktop user system 1104 to handheld user system 1109. The master server 1100 and both slave servers 1101 and 1102 can then redirect their respective messages from transmitting 1103 to the desktop user system 1104, instead, to transmitting 1110 to the handheld user system 1109.

Because any particular desktop user system 1104 and handheld user system 1109 each may have respective distinct hardware and components. For example, the desktop user system 1104 and handheld user system 1109 each may include different components, such as varied display type or size, keyboard type, touch versus mouse input, and other of a wide variety of types and styles of components. The desktop user system 1104 and the handheld user system 1109, therefore, each communicate to the servers the respective hardware/component details for the system 1104 or 1109 employed for communications at each time. The servers use the corresponding details for the respective system 1104 or 1109, as applicable, automatically modifying communication and messaging operations accordingly. For example, operations may be changed to provide for varied overall size of windows, response to touch events and other inputs and outputs of each respective system 1104 or 1109, and other events, characteristics and responses of the respective systems 1104, 1109.

Further in the exemplary embodiment, if the user 1105 moves 1107 to commence communicating via the tablet user system 1112, rather than the handheld user system 1109, the message communications 1110 follow 1111 and messaging 1113 is to tablet user system 1112 by the servers. As before, if the handheld user system 1109 and tablet user system 1112 report different components to the servers, the servers modify operations accordingly. The user has now used three different user systems and the servers provide serving operations for each unique system 1104, 1109 and 1112, respectively, for example, adjusting to accommodate differing input/outputs of respective devices, respective display size, and other unique features and components, as applies.

Figure 12:
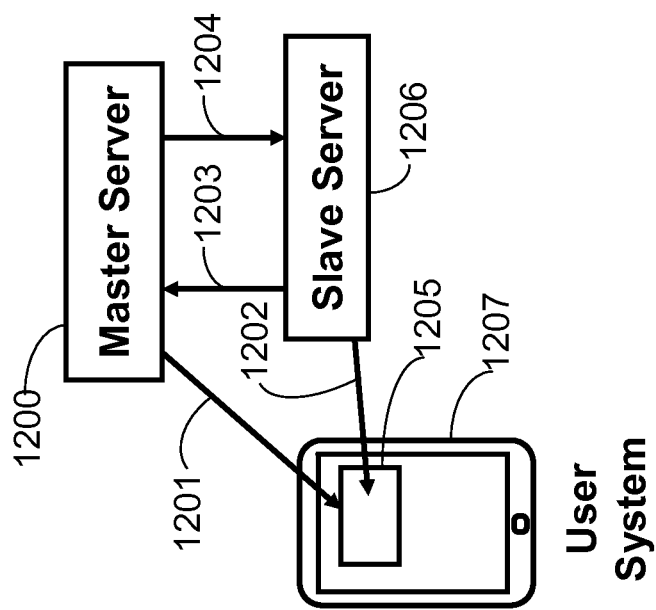
FIG. 12 illustrates an exemplary user system in operation with an exemplary server system, without need for conventional application programming interfaces (APIs), according to certain embodiments of the invention.

Referring to FIG. 12, an exemplary method of operation of hierarchical servers for communicating with user device(s) dispenses with conventional application programming interface (API) requirements for the user devices. In this example, slave server 1206 displays a popup event notification on user system 1207. Slave server 1206 sends a request 1203 message to master server 1200. The request 1203 message informs the master server 1200 that the slave server 1206 application wishes to display the popup event notification on the user system 1207. If permissible per the master server 1200, the master server 1200 sends a window message 1201 to the user system 1207. A window 1205 is displayed on the user system 1207. The master server 1200 replies to the slave server 1206 with an update 1204 message. Slave server 1206 sends the message 1202, such as a video message, to the user system 1207. The message 1202 is display in the window 1205 as pixels representing the video message. Master server 1200 can animate the location of window 1205 displayed by the user system 1207, for example, to draw attention to the message 1202 by a user of the user system 1207. Slave server 1206 need not be made aware of animation or similar direction of the master server 1200, if applicable, and the master server 1200 (or any other server so permitted per the hierarchy) can direct operation of the user system 1207 in similar manner. It is notable that, in this example, a special event notification API is not needed.

Figure 13:
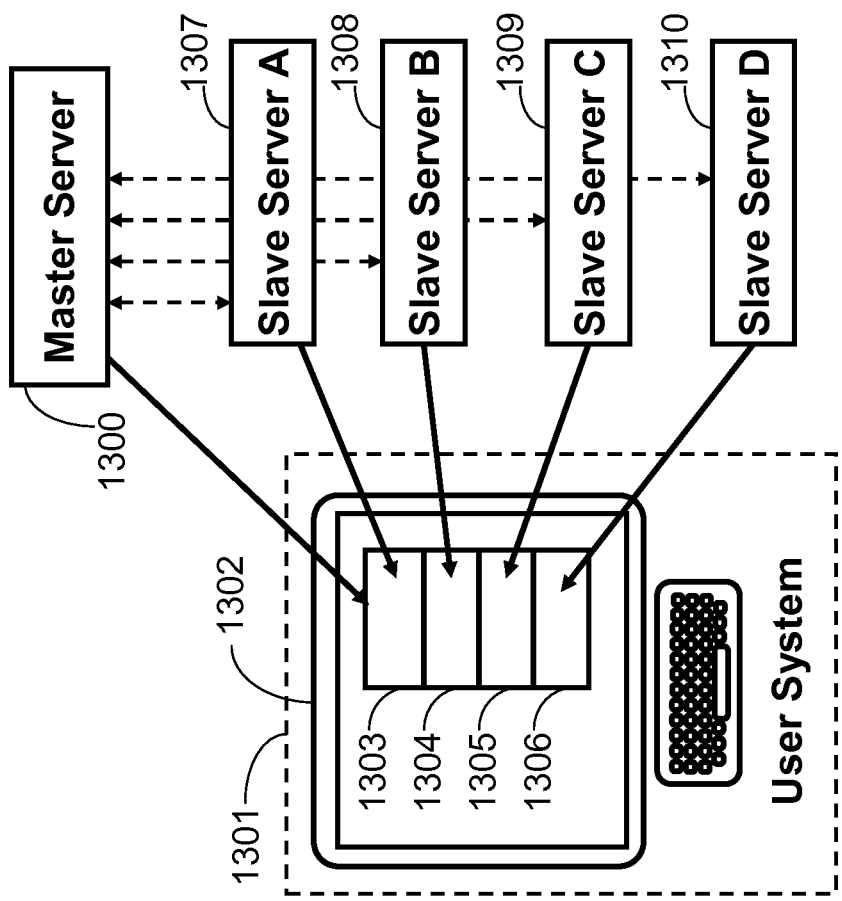
FIG. 13 illustrates another exemplary system in operation with an exemplary server system, without need for conventional application programming interfaces (APIs), according to certain embodiments of the invention.

Referring to FIG. 13, another exemplary method of operation of hierarchical servers for communicating with user device(s) also dispenses with conventional application programming interface (API) requirements for the user devices. In the example, master server 1300 displays a news feed list, through communications of more than one news server, for example, four news servers: slave servers A 1307, B 1308, C 1309 and D 1310. Master server 1300 communicates to the user system 1301 creating four identical windows 1303, 1304, 1305, 1306 on the display 1302 of the user system 1301. Master server 1300 then connects to the four slave servers A 1307, B 1308, C 1309 and D 1310, respectively, and the slave servers A 1307, B 1308, C 1309 and D 1310 send respective video messages, to the user system 1301. The messages each fill a respective one of the windows 1303, 1304, 1305, or 1306 of the user system 1301 with pixels representing an applicable video message. The message of slave server A 1307 fills window 1303, the message of slave server B 1308 fills window 1304, the message of slave server C 1309 fills window 1305 and the message of slave server D 1310 fills window 1306. A special news feed API is, thus, not required.

Referring to FIG. 14, another exemplary method of operation of hierarchical servers for communicating with user device(s) permits access between applicable servers and user system(s) in the presence of a firewall to the user system(s). In the embodiment, a master server 1400 and a slave server 1401 connect to a user system 1403 across a user side firewall 1402 between the servers 1400, 1041 and the user system 1403. This type of firewall, for example, allows communications to be initiated from devices, such as the user system 1403, behind the firewall 1402 to pass through the firewall 1402, but restricts communications across and through the firewall 1402 to the user system 1403 from outside the firewall 1402. Once communications is initiated by the user system 1402 through the firewall 1402 to outside, then communications may flow both ways, with devices outside the firewall 1402 communicating through the firewall 1402 to the user system 1403, and vice versa. However, upon completion of a communication session, such as through time-out of access/communications or otherwise, the applicable server(s) discontinue communicating with the user system 1402 until re-initiation of communications as has been described.

Further regarding FIG. 14, the firewall 1402 allows initial communications from user system 1403 out to servers 1400 and 1401, but does not allow initial communication from servers 1400 or 1401 to user system 1403. In operation, user system 1403 initially communicates 1404 with master server 1400. This opens up a communications path in firewall 1402 and master server 1400 can send message 1405 to user system 1403. When it is desired for slave server 1401 to communicate with user system 1403, master server 1400 sends slave server 1401 a connect message 1406. Slave server 1401 responds with an ok message 1407. Master server 1400 sends user system 1403 a next connect message 1408 for the slave server 1401. Upon receiving the connect message 1408, user system 1403 sends slave server 1041 another connect message 1409. The communications path in firewall 1402 is now open for two-way communications between both servers 1400, 1406 and the user system 1403. Slave server 1041, for example, sends message 1410 to user system 1403.

If communications of messages between slave server 1401 and user system 1403 are discontinued for a time-out period, firewall 1402 closes the communications path available for two-way communications between slave server 1401 and user system 1403, for example, slave server 1401 sends message 1411 to user system 1403 but the message 1411 cannot pass through at the firewall 1402. Slave system 1401 must send a connect request message 1412 to master server 1400 in order to reestablish two-way communications across the firewall 1402. Master system 1400 responds by sending a connect message 1413 to user system 1403. Upon receiving connect message 1413, user system 1403 sends a connect message 1414 to slave server 1401 to open the firewall 1402 for two-way communications via slave server 1401. Slave server 1401 then resends message 1411 as message 1415, and the message 1415 passes through the firewall 1402 for receipt by user system 1403.

Figure 15:
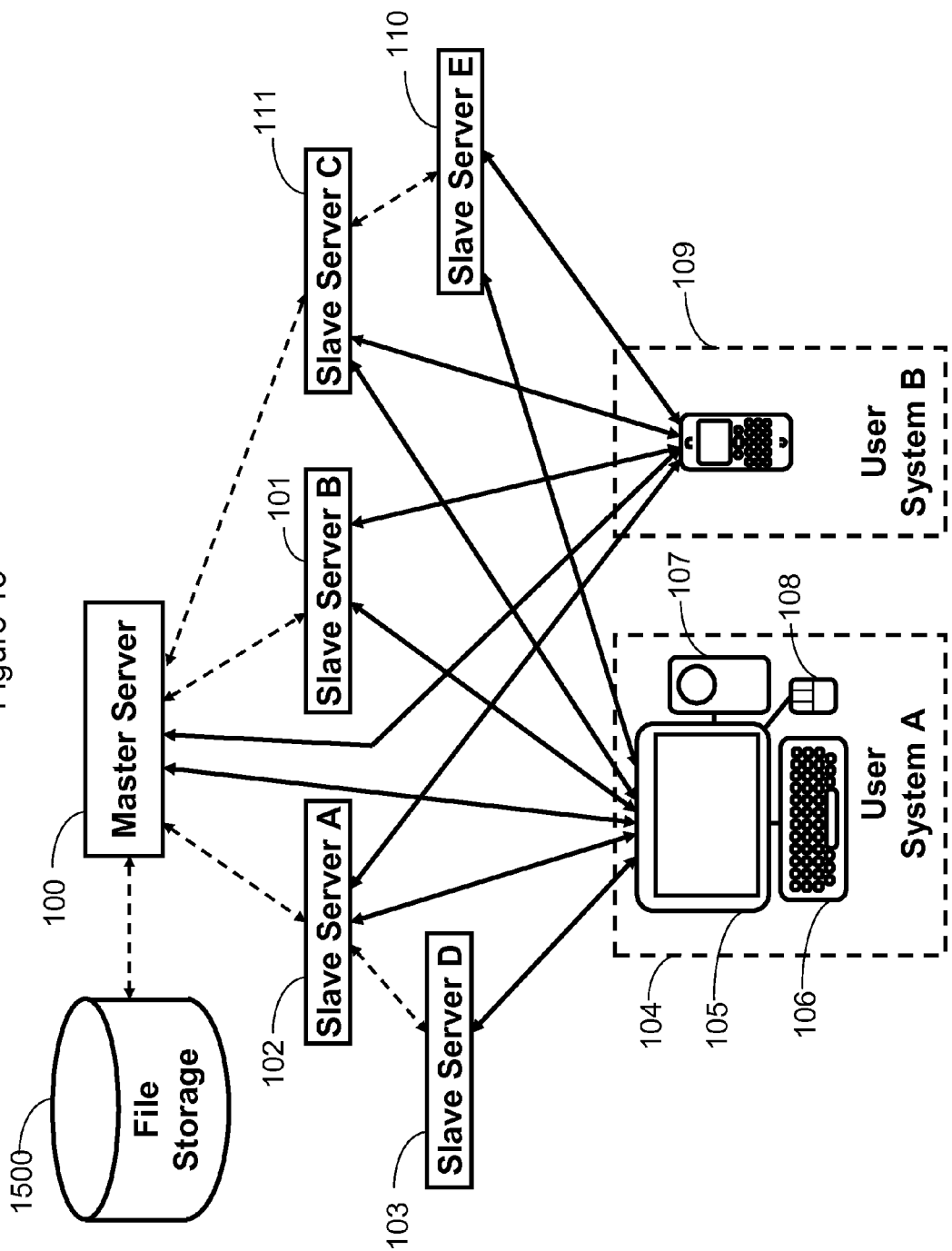
FIG. 15 illustrates exemplary user systems in operation with an exemplary server system to securely access a file system, according to certain embodiments of the invention.

Referring to FIG. 15, a server hierarchy controls access of slave servers, and correspondingly, of user system(s) from such slave servers, to files contained a file system 1500, such as a file database. Devices and features of FIG. 14 are similar to those of FIG. 1, with addition of the file system 1500. In the embodiment, master server 100 connects directly to file system 1500 and can access all files contained in file system 1500. Master server 100 controls access permission of slave server 102, and can provide the slave server 102 access rights to all or a sub-set of the files on file system 1500, as applicable for the embodiment. For example, such sub-set can be one file, a file directory, a group of files, or other. Access rights for the files may be read-only, read-write, append-only or any other type of file access according to the implementation. Consistent with the permissioning and hierarchy as in other respects, any slave-server may pass on its access rights to one or more other lower-level slave servers to which connected.

Figure 16:
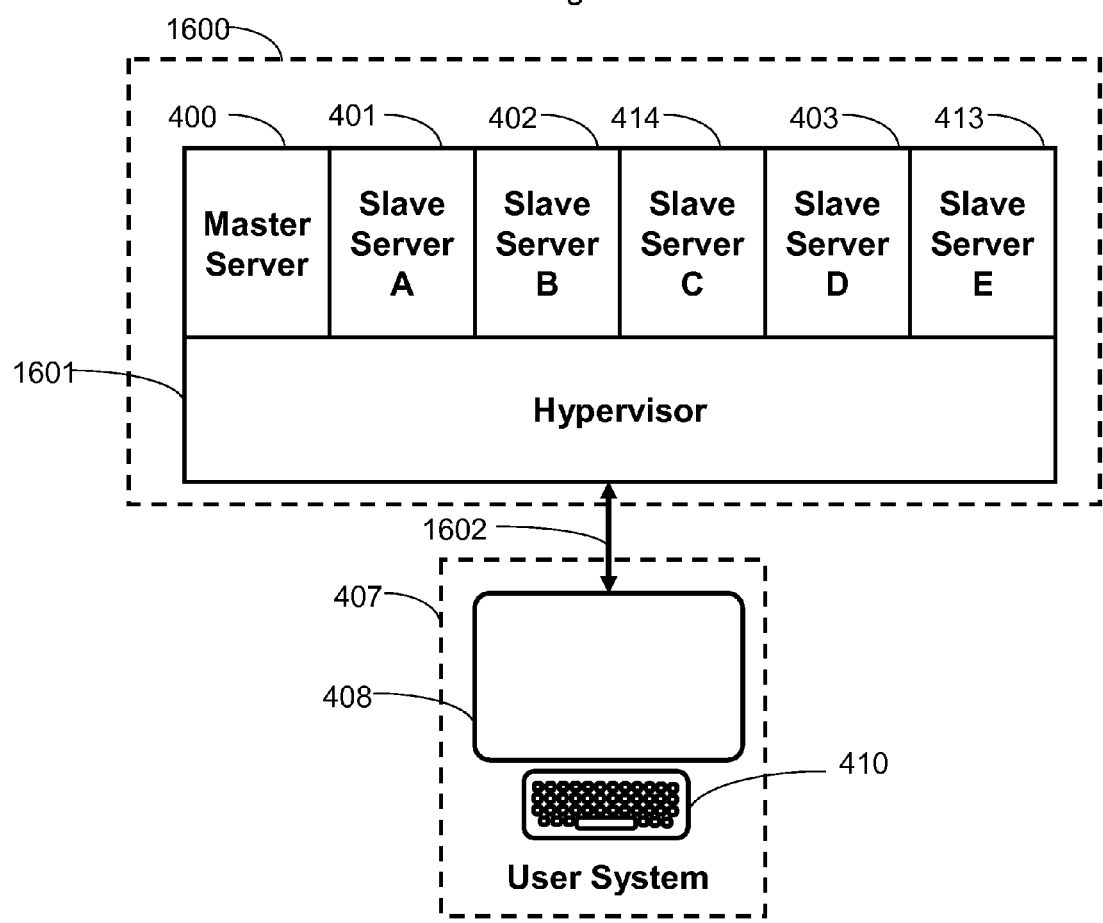
FIG. 16 illustrates an exemplary server system together with a hypervisor for virtualizing a master server and multiple slave servers within a single physical server device, according to certain embodiments of the invention.

Referring to FIG. 16, an example embodiment of hierarchical servers provides virtualized master and slave servers within a single physical server device (or more than one such server device, in combination, as may be applicable). In the example, hierarchical servers, such as that of FIG. 4, includes each server 400, 401, 402, 414, 403, 413 in a single server device (or more than one device, in combination, as applicable). For purposes of explanation and example, all the servers 400, 401, 402, 414, 403, 413 are contained in a single device 1600. The master server 400 and the slave servers 401, 402, 414, 403 and 413 are each virtualized by the hypervisor 1601 and contained within the same single device 1600. The user system 407, for example, including a display 408 and a keyboard 410, is connected to the single server device 1600 via a network connection 1602, and the permitted access and communications of respective master server 400 and slave servers 401, 402, 414, 403 and 413, each virtualized in the single device 1600, are controlled through associations between the respective servers according to the hypervisor 1601.

Figure 17:
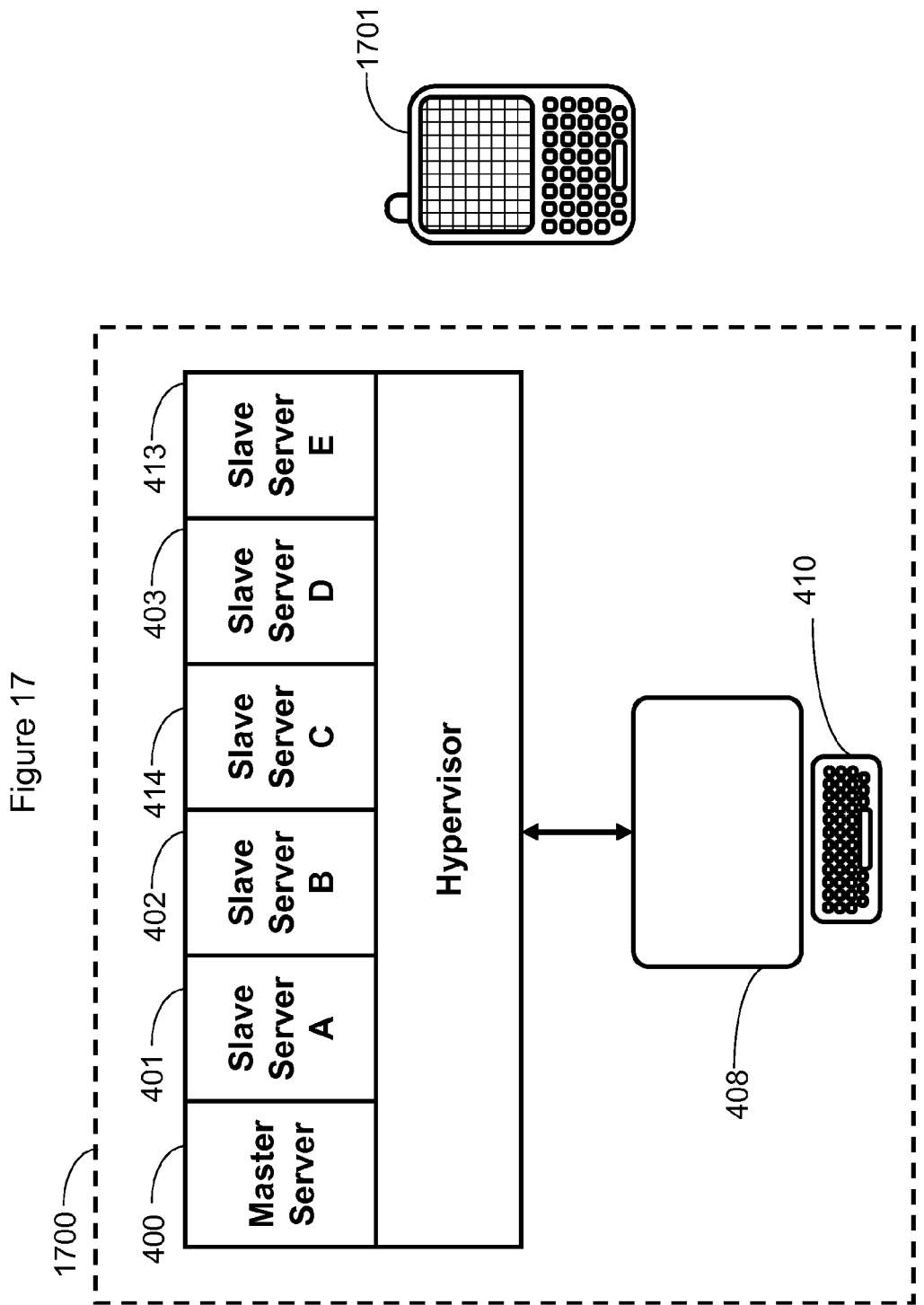
FIG. 17 illustrates an exemplary server system, together with a hypervisor virtualization of a master server and multiple slave servers, as well as a user system, all included within a same single physical server device, according to certain embodiments of the invention.

Referring to FIG. 17, another exemplary embodiment includes virtual hierarchical servers. In the example and for purposes of explanation, the respective master and slave servers and also the user system (in this example) are all contained within a single physical server device (or, according to implementation, more than one such device in combination). The single device 1700 in the example includes the master server 400 and the slave servers 401, 402, 414, 403, 413, as well as a display 408 and keyboard 410. This exemplary configuration of virtual servers and user system in the same device 1700 can be a device 1701 or other similar arrangement including input/output features of display, keyboard, communications, storage, and the like as may be applicable in the configuration.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems and device(s), connection(s) and element(s) that may cause any benefit, advantage, or solution to occur or become more pronounced are not to be construed as a critical, required, or essential feature or element of any or all the claims. As used herein, the terms "comprises, "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A computing system operative via communications over a communications network, comprising:
   at least one non-intelligent user system communicatively connected to the communications network, each of the non-intelligent user system, respectively, including at least one low-level component, respectively; and
   a hierarchical set of servers communicatively connected to the communications network, including a master server communicatively connected to a slave server, (i) the master server and (ii) if communicatively permitted access to the non-intelligent user system by the master server, the slave server, communicatively control via the communications network the low-level component, respectively, of the non-intelligent user system, respectively.

2. The computing system of claim 1,
   wherein each of the at least one non-intelligent user system includes limited processing capability for communicating on the network and at least one low-level component, respectively, the at least one low-level component, respectively, is selected from the group consisting of: camera, microphone, speaker, printer, flash drive, GPS receiver, display for displaying windows, another input device, and another output device;
   wherein the user system mutiplexingly communicates input of the low-level component on the communications network to the (i) the slave server, if the master server has allowed access by the slave server to control the low-level component, and otherwise, (ii) the master server;
   wherein (i) the slave server, if the master server has allowed access by the slave server to control the low-level component, and otherwise, (ii) the master server, multiplexingly communicates on the network to the user system to controllingly direct output of the low-level component.

3. The computing system of claim 1, wherein communicative access over the network by respective slave servers to the non-intelligent user system, respectively, is controlled by the master server and any slave server with priority in the hierarchical set granted applicable permission by either of the master server and another slave server with priority in the hierarchical set.

4. A server system for communicating over a network with a user system of at least one component, comprising:
a master server;
at least one first level slave server connected to the master server;
wherein the master server is capable of permitting any of the at least one first level server to access the user system over the network to selectively control any of the at least one component of the user system;
wherein each of the at least one component is selected from the group consisting of: an input component, an output component, and combination.

5. The server system of claim 4,
wherein a traditional desktop style window user interface is interactively displayed on the user system via, either of alone and in combination, the master server and any of the at least one first level slave server permitted to access the user system by the master server;
wherein a respective distinct window frame, is created in the window user interface of the user system for selective operations of the user system by each of the master server and any of the at least one first level slave server permitted to access the user system by the master server, as applicable, the respective distinct window frame of the master server and any of the at least one first level server is created via communications over network between the master server and the at least one first level slave server, as applicable, and the user system; and
wherein one or more application unit of any of the master server and, if and as permitted by the master server, any of the at least one first level slave server, respectively, is respectively displayed in the respective distinct window frame corresponding the master server and the first level slave server, as applicable, of the user system, via communications over the network between the master server and, if applicable, the first level slave server permitted to access the user system by the master server, as applicable.

6. The server system of claim 4, further comprising:
a plurality of different types of user systems of a same user communicatively connected, either of synchronously and asynchronously, to the network,
the master server and, if permitted by the master server, the first level slave server, communicates on the network with each one of the plurality of different types of user system, and the server system automatically adjusts operation based on the type of the user system then being employed for communications by the user.

7. The server system of claim 4, wherein the server system dispenses with any requirement for an Application Programming Interface (API) between the master server and the at least one first level slave server connected to the master server.

8. The computing system of claim 1, further comprising:
a file system connected to at least one of the group consisting of: the master server, any of the at least one slave server, and the hierarchical set;
wherein the master server can access all files of the file system and the slave server, respectively, can be permitted access to select files of the file system by the master server.

9. The system of claim 1,
wherein the master server and, if communicatively permitted by the master server, the slave server, communicates across a firewall with the user system, on initiation by the user system of communication across the firewall to any of the master server and any slave server, respectively, of the hierarchical set;
wherein the master server, in conjunction with communications by the master server with the user system over the communications network, controls permitting for communicative accessibility by each of the at least one slave server, respectively, to the user system through the firewall.

10. The computing system of claim 1, further comprising:
a hypervisor,
the hierarchical set is a unitary device comprising a virtual master server and at least one virtual slave server, communicatively connected to the hypervisor.

11. The computing system of claim 10, wherein the user system is included in the unitary device of the virtualized master server and the at least one virtualized slave server.

12. A method of communicating by a hierarchical set of servers with a user device over a communications network connected to the user device, comprising the steps of:
controlling access rights to the user device, of a plurality of slave servers by a master server of the hierarchical set, wherein the master server has full access to control the user device via communications over the network and each slave server of the plurality requires access permission to control the user device; and
controlling access rights of at least one of the plurality of slave servers by the master server, the at least one of the plurality of slave servers has access to control the user device via communications over the network only if and as permitted by the master server;
controlling access rights of at least one of the slave server, as a sub-level slave server to another of the slave server of the plurality of the hierarchical set, by at least one other of the slave servers, as a higher level slave server of the hierarchical set, the at least one sub-level slave server has access to control the user device via communications over the network only if and as permitted by the master server and the higher level slave server.

13. The method of claim 12, further comprising the steps of:
creating, via communications of the master server with the user device over the communications network, at least one of distinct window of the user device for the master server; and
creating, via communications over the communications network of each slave server permitted access to the user device, a respective distinct window of the user device for each slave server, respectively.

14. The method of claim 13, further comprising the steps of:
communicating by the user device over the network, a data representing input of a component of the user device, to either of (i) the master server and (ii) at least one of the slave server permitted access to the user device;
wherein an application program stored on either of (i) the master server and (ii) any of the at least one of the slave server, of the step of communicating by the user device, processes the data representing input of the component of the user device.

15. The method of claim 14, further comprising the steps of:
communicating to the user device over the network, a data representing output of a component of the user device, by either of (i) the master server and the at least one slave server, of the step of communicating by the user device, the data representing output controls an output by the user device.

16. The method of claim 15, wherein the data representing output is an output by the user device selected from the group of: video, audio, text, graphics, multimedia and combinations.

17. The method of claim 14, wherein the user device includes limited processing capability for the input and output by the user device and communications on the network with the master server and any of the at least one slave server.

18. The method of claim 14,
wherein the master server and the slave servers each include a respective unit for a respective application output by the user device;
wherein step of communicating by the user device is performed with either of (i) the master server and (ii) the slave server permitted access to the user device, of the respective unit, for the operation of the respective unit via communications over the network; and
wherein a separate respective distinct window of the user device is created for the respective unit operated for the user device, by applicable one of (a) the master server and (b) the slave server permitted access to control the user device, of the respective unit.

19. The method of claim 18, wherein the respective unit is selected from the group of: business productivity unit, calendar, clock, video game, photo developer unit, media player, and combinations.

20. The server system of claim 4, further comprising:
a window of the user system, respective distinct ones of the window are uniquely created on the user system by the master server for each respective one of the at least first level slave server permitted access to the user system by the master server;
wherein the first level slave server, via communicated data representing pixels for display in the window, to the user system, fills the window of the user system with pixels, if the master server has permitted the first level slave server to access the user system over the network to control the window.

21. The server system of claim 4, further comprising:
at least one higher level server selected from the group of: the master server, the first level slave server, another slave server to the first level slave server, and another slave server to any other slave server of greater hierarchy;
at least one lower level server relative to the at least one higher level server, selected from the group of: the first level slave server, another slave server to the first level slave server, and another slave server to any other slave server of greater hierarchy; and
a window of the user system, a respective one of the window is uniquely created on the user system by any higher level server for each respective one of the lower level server permitted access to the user system by the higher level server and, if the master server is not the higher level server, the master server;
wherein the lower level slave server permitted access to the user system, respectfully, via communicated data to the user system representing pixels for display in the window, fills the window of the user system with pixels.

22. The server system of claim 21, wherein the pixels are selected from the group of: a typical desktop style frame, graphics output of an application program of the lower level server, a browser, spreadsheet, live video, and video stored in the lower level server.

23. The server system of claim 21, wherein the respective one of the window for each respective one of the lower level server is the only location that the lower level server can fill with pixels at the user system.

24. The server system of claim 22, further comprising:
a second window created by the higher level server on the user system within the window;
wherein the higher level server permits access to the second window by any of the lower level servers.

25. The server system of claim 24, wherein the lower level server permitted access to the second window is permitted access only to the second window and not otherwise to the window and can fill the second window with pixels at the user system via communications over the network.

26. The computing system of claim 1, wherein the slave server is a first level slave server of the hierarchical set, further comprising:
a second level slave server of the hierarchical set communicatively connected to the first level slave server and the communications network, the second level slave server controls the low-level component, respectively, of the non-intelligent user system, respectively, if communicatively permitted access by the first level slave server to control the low-level component.

27. The computing system of claim 26, further comprising:
at least one other level slave server of the hierarchical set communicatively connected to the communications network, each of the at least one other level slave server hierarchically arranged to controllingly access the non-intelligent user system , respectively, via the communications network, to control the low-level component, respectively, if communicatively permitted access by either of the (i) the master server and (ii) if any slave server of higher priority to the other level slave server in the hierarchical set is permitted access by the master server, the slave server of higher priority in the hierarchical set.

28. The computing system of claim 27, further comprising:
a file system connected to at least one of the group consisting of: the master server, any of the slave server, and the hierarchical set;
wherein the master server can access all files of the file system and the slave server can be permitted access to select files of the file system by the master server and, if applicable, any higher priority slave server of the hierarchical set having permitted access to the select files.

* * * * *